(12) United States Patent
Spindler et al.

(10) Patent No.: US 9,441,970 B2
(45) Date of Patent: Sep. 13, 2016

(54) DIGITAL MAP ICON MANAGEMENT SYSTEM

(71) Applicant: Harman Becker Automotive Systems GmbH, Karlsbad (DE)

(72) Inventors: Carsten-Christian Spindler, Karlsruhe (DE); Vladimir Ivanov, Munich (DE); Martin Fischer, Munich (DE); Simon Schütz, Karlsruhe (DE)

(73) Assignee: HARMEN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 14/032,999

(22) Filed: Sep. 20, 2013

(65) Prior Publication Data

US 2014/0025298 A1    Jan. 23, 2014

Related U.S. Application Data

(63) Continuation of application No. PCT/EP2011/005437, filed on Oct. 27, 2011.

(30) Foreign Application Priority Data

Mar. 22, 2011    (EP) .................... 11002357

(51) Int. Cl.

| | | |
|---|---|---|
| G06F 17/30 | (2006.01) | |
| G01C 21/00 | (2006.01) | |
| G01C 21/32 | (2006.01) | |
| G01C 21/36 | (2006.01) | |

(Continued)

(52) U.S. Cl.

CPC .............. *G01C 21/00* (2013.01); *G01C 21/32* (2013.01); *G01C 21/3682* (2013.01); *G06F 3/04817* (2013.01); *G06F 17/3028* (2013.01); *G06F 17/30241* (2013.01); *G06F 17/30244* (2013.01); *G06F 17/30265* (2013.01); *G06F 17/30268* (2013.01); *G06F 17/30324* (2013.01); *G09G 5/39* (2013.01)

(58) Field of Classification Search

CPC .................... G06F 17/30244; G06F 17/30324
USPC .......................................... 701/533; 715/771
See application file for complete search history.

(56) References Cited

U.S. PATENT DOCUMENTS 5,355,314 A * 10/1994 Feigenbaum ................. 345/629
5,734,873 A    3/1998 Lobodzinski et al.
6,813,394 B1 * 11/2004 Matsumoto et al. ......... 382/305

(Continued)

FOREIGN PATENT DOCUMENTS

JP    10-89990    4/2010

OTHER PUBLICATIONS

European Search Report dated Jun. 25, 2013, pp. 1-5, European Patent Application No. 11 002 357.9-1557, European Patent Office, Rijswijk, Netherlands.

(Continued)

*Primary Examiner* — Todd Melton
(74) *Attorney, Agent, or Firm* — Artegis Law Group, LLP

(57) ABSTRACT

A navigation system may use digital maps to represent cartographic features during guidance along a route to a destination requested by a user. A system and method are provided for management of icons used to represent the cartographic features by storing data for multiple icons in a data array representing an image containing the plurality of icons.

20 Claims, 3 Drawing Sheets

(51) Int. Cl.
  *G06F 3/0481*  (2013.01)
  *G09G 5/39*  (2006.01)

(56) References Cited

U.S. PATENT DOCUMENTS

| | | | |
|---|---|---|---|
| 7,665,040 B2 | 2/2010 | Nakamura | |
| 7,801,676 B2* | 9/2010 | Kurosawa et al. | 701/429 |
| 8,525,851 B2* | 9/2013 | Klassen et al. | 345/629 |
| 2002/0065605 A1 | 5/2002 | Yokota | |
| 2008/0021644 A1 | 1/2008 | Meyer | |
| 2008/0162031 A1 | 7/2008 | Okuyama et al. | |
| 2009/0281718 A1* | 11/2009 | Gibran et al. | 701/200 |
| 2012/0287116 A1* | 11/2012 | Massimino et al. | 345/419 |

OTHER PUBLICATIONS

XP-002659786, User Manual, IGO 8, "Navigation software for mobile devices", UK English, Dec. 2008, 92 pgs.

XP-002659833, Naviextras.com Forum, Thread—"How do you add/merge bmp poi files?" Aug. 2008, 6 pgs.

XP-002659832, "How to install poi icons IGO 8" www.austech.info, Austech Forums, Feb. 2010, 10 pgs.

International Search Report dated Nov. 23, 2011, pp. 1-3, PCT Application No. PCT/EP2011/005437, European Patent Office, Rijswijk, Netherlands.

* cited by examiner

DIGITAL MAP ICON MANAGEMENT SYSTEM

PRIORITY CLAIM

This application is a continuation of International Application No. PCT/EP2011/005437, filed on Oct. 27, 2011, which claims the benefit of priority of European application no. EP 11 002 357.9 filed on Mar. 22, 2011, both of which are incorporated by reference.

BACKGROUND OF THE INVENTION

1. Technical Field

The present invention relates to digital maps representing towns and landscapes that may be used for route guidance by a navigation system and, in particular, it relates to management and display of icons in digital maps.

2. Related Art

The use of navigation systems, in particular, in vehicles such as automobiles has become increasingly prevalent. Usually on board navigation computer systems analyze the combined data provided by Global Positioning System (GPS), motion sensors such as antilock breaking system (ABS) wheel sensors, as well as a digital map to determine an actual position and velocity of a vehicle with increasing precision.

A navigation system typically can make use electronic digital maps to represent cartographic features such as, as streets, buildings and rivers. The navigation system may make use of a medium such as, for example, a compact disk or a digital video disc to store the data that relates to the cartographic features. After map matching, an actual position of the user may be indicated in the digital map. By acoustic and/or visualized information the user may be guided to a predetermined destination.

SUMMARY

An icon management system of a vehicle navigation system may manage a plurality of icons in a navigation database. The system may include a processor, a database and a memory among other components. The system may store data for a subset of icons in a data array representing an image containing the subset of icons. The data array may be stored in a memory that has faster retrieval speed i.e. lower latency, than the database. During navigation, the system may identify a map element and retrieve an icon corresponding to the map element from the data array loaded in the memory having the fast retrieval speed. The navigation system may determine a position to display the icon in a map displayed to the user for providing a navigation route. Alternately, or in addition, the icon may be displayed as part of a signpost. The retrieved icon may be displayed at the determined position(s) in the map on a display device.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
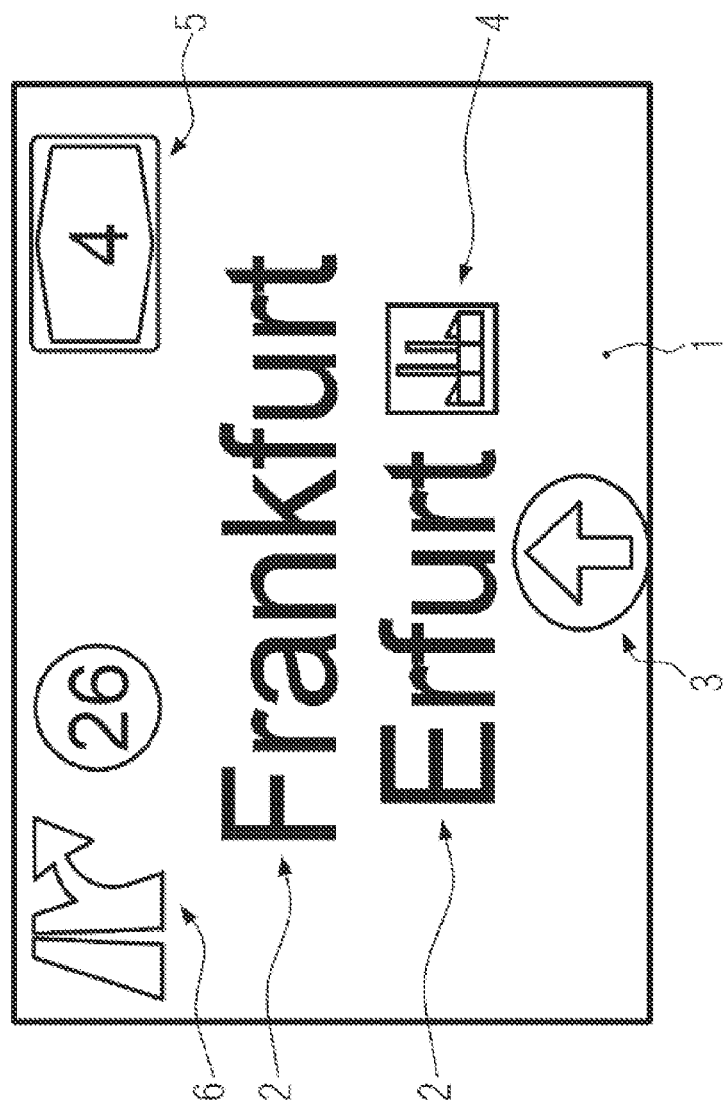
FIG. 1 illustrates an example of a signpost for a digital map.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

In some examples, navigation systems are able to display an image of detailed digital maps indicating routes to destinations, the types of maneuvers to be taken at various locations such as, for example, junctions as well as different kinds of points of interest such as, for example, gas stations, restaurants, and landmarks. As a vehicle that includes a navigation system changes position, the vehicle position mark on the displayed image may change or the digital map may be scrolled, while the vehicle position mark remains fixed at a predetermined position.

In some examples, navigation systems may provide enlarged views, for example, of junctions on a route where a driver should turn, in order to help the driver to identify the route to be taken to the predetermined destination more accurately. The displayed images may represent simplified synthesized views from a perspective of the driver. In some examples, a two-dimensional representation may confuse the driver, for example, if roads are intersecting a different height levels or in rotary turns with roads in close proximity. Throughout this disclosure, the terms "road" and "street" may be used in an interchangeable manner.

In some examples, navigation systems may include algorithms for transforming data from a geographic database into a 3-dimensional perspective view, which may be more easily understood by the driver. Some systems may display an intersection approached by the vehicle at variable angles relative to the road depending on the complexity of the intersection. Throughout this disclosure, the terms "intersection" and "junction" may be used in interchangeably.

In order to provide navigation functions, the navigation systems may include one or more databases that include data which represent physical features of a geographic region. An employed navigation database may include a main image file including bitmap images of cartographic features including, for example, road geometry, signposts, landmarks, and skyline. The main image file may further include vector graphics of the cartographic features including, for example, the road geometry, the signposts, the landmarks, and the skyline.

Digital maps used for navigation purposes may use icons. An icon may be a symbol providing information such as, for example, information about traffic, point of interest, route guidance, traffic signs, and other such navigation related information. The icon may be part of a signpost. FIG. 1 illustrates an example signpost for use in a digital map that may be generated and displayed with the navigation system. The signpost may include inter alia text and icons and a background 1 of the signpost. A text may include, but is not limited to, a city name, a street name, a building name such as a hospital, a name of a park or recreational site, or the like. The icon may include, but is not limited to, a directional icon such as an arrow, an icon representing a geographical location icon such as a hospital or airport or a soccer stadium, a brand icon identifying a particular restaurant, or the like. In the example of FIG. 1, the signpost includes signpost text 2 indicating the names of cities that may be reached on the highway upon which the signpost may be positioned. The signpost also includes an arrow sign 3 indicating the direction to the cities named by the signpost text 2. The signpost, furthermore, may include a signpost icon 4 indicating an area category, such as an industrial area, a road number icon 5 and an exit number icon 6. The road number icon 5 may indicate the number of a road; in the example shown, the icon indicates the road is part of the German Autobahn. The exit number icon 6 indicates the number of an exit from a road, in the shown example, exit 26 of the German Autobahn. In alternatively, or in addition, the exit number icon 6 may indicate an exit direction. All of the elements may be stored separately in a navigation database.

Retrieval of icons stored in the navigation database may be time consuming. For example, in the context of embedded systems as vehicle navigation systems with limited computational resources it may be desirable to shorten the access time to load and display icons in a digital map.

Figure 3:
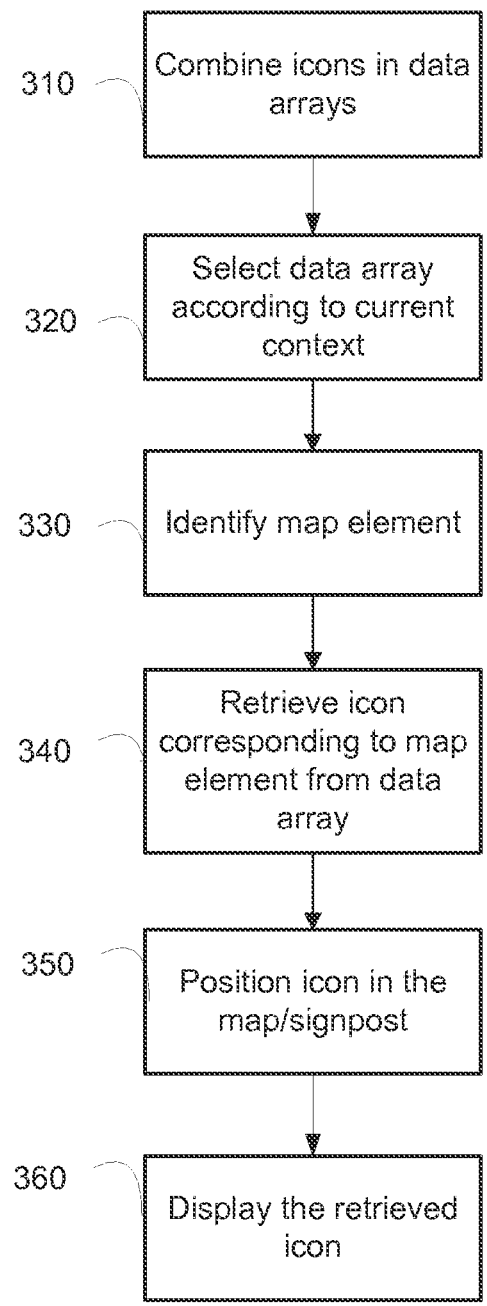
FIG. 3 illustrates a flow diagram of an example operation of an icon management system.

FIG. 3 provides an example method performed by an icon management system for management of icons in the navigation database that enable fast retrieval of icons for display. The method may include storing data for a plurality of icons in data arrays, as shown in step 310. Each of the data arrays may represent an image containing the plurality of icons. Each icon may be identified by data of the icon. An icon may be a two or three-dimensional symbol. The data array may store the data of one or more icons. The data array may be an image, for example, in the portable network graphics (PNG) format, with each icon in the data array associated with a defined location. For example, the data array may represent an image with a number $n_1$ of icons in a first row, a number $n_2$ of icons in a second row and so on to a number of icons $n_m$ in an m-th representing a last row of the image. $n_1$ to $n_m$ may or may not be the same integer number.

In an example a single PNG image may be calculated from a number of individual PNG images representing icons. In addition, entries representing references to positions of the individual PNG images contained in the single PNG image may be stored in the data array.

Consequently, the icons may not be read out separately when they are needed for display in a digital map used for navigation purposes. Rather, all, or some portion, of the icons of the data array may be read into a memory as part of the image and held for subsequent use in the digital map. As described later, the navigation system may load the single data array in a graphic memory or video memory of the navigation system based on a current context of the navigation system in step 320. Once loaded into the memory each of the icons of the data array can quickly be retrieved from the memory for display in the digital map in step 340.

The icons retrieved may correspond to a map element identified in step 330. As described later, a position to display the retrieved icon on the digital map may be determined in step 350 and the retrieved icon displayed at the determined position in step 360. Thus, delay caused by loading and displaying of individual icons from the database may be avoided.

In an example, the data array may be a table including information regarding widths, heights, and coordinates (x- and y-coordinate values) of icons in the image represented by the data array and further including the icons at particular positions. Each of the plurality of icons in the table stored in the memory of the navigation system may be retrieved for displaying in a digital map by referring to the coordinates of the icon in the image. Moreover, the table may be referred to in order to obtain height and width of the icon and further information used for deciding a position of the icon in the digital map. Appropriate positioning of the icons in the digital map may affect readability of the icon. For example, in a three-dimensional digital map used for navigation purposes, icon(s) may be hidden behind other elements of the digital map. Alternately, the icon(s) may hide completely or partially another element of the digital map.

The navigation system may further store another plurality of icons in another data array. The first and the second plurality of icons may differ from each other such that, whenever an icon of the first plurality of icons is displayed in the digital map, no icon of the second plurality of icons is concurrently displayed on the digital map. Thus, only one of the pluralities of icons may be loaded in the memory while the other may be stored in the navigation database. The other plurality of icons in the navigation database may be loaded at another time in the memory of the navigation system, such as under different operating conditions.

An example navigation system may provide an off-road navigation mode and a particular plurality of icons may be loaded in the memory only if the off-road mode is selected by a user. The particular plurality of icons for off-road navigation may not be loaded in an on-road mode which may be, for example, a default mode. In another example, the first plurality of icons may consist of icons used during navigation in day-time whereas the second plurality of icons may consist of icons used during navigation in night-time or vice versa. Consequently, only icons stored in the data array (for example, a table as described above) that is relevant to current navigation process may be loaded in the memory for fast retrieval.

One or more icons may be displayed as part of a signpost. The signpost may be analogous to a sign that in the physical environment, for example, is positioned at highway intersections such as at, intersections of German Bundesstraßen and Autobahnen. The signpost may indicate the direction to a city; facilities such as an industrial area, a soccer stadium, an airport, or any other area; a number of a road, a highway, or other thoroughfare; and/or the road number of a road branching at an intersection (junction). An example signpost was previously discussed with reference to FIG. 1.

The signpost may include a background of the signpost and some signpost text. The signpost may additionally include at least one signpost icon. A signpost icon may indicate/represent symbolically an industrial area, a soccer stadium, an airport, or some other location or area. The background of the signpost and the icons may be stored separately. The separately stored (data of a) background may be retrieved from the navigation database when the signpost with that background is to be displayed. The icons to be displayed in the signpost may be retrieved from the graphic memory in which the icons have been loaded.

The navigation system may further store a reference between the icons and the background of the signpost in the navigation database. The reference may represent a (data) link between the icons and the background of the signpost. The reference may allow composing the signpost with the icons and the background without any online or runtime calculation. Further, the background of the signpost may be linked to the icons beforehand and may avoid risk of a false assignment during online calculation.

The navigation system may be a vehicle navigation system, with a display device providing route guidance information to a user. The navigation system may further include one or more non-transitory computer readable media or memory, such as read only memory, random access memory, or any other form of memory capable of storing information. The memory may store computer-executable instructions. The memory may also store data used during operation of the navigation system. The navigation system may further include a navigation database containing the digital map data and the one or more data arrays each containing data of a plurality of icons. In the navigation database each data array may contain a plurality of icons, such as in a table consisting of information on the width, height, and coordinates of the icons in the image. The display device may be configured to display the digital map including an icon of the plurality of icons.

The navigation system may display icons in a digital map via a method in which data for a plurality of the icons may be stored in a data array representing an image containing a plurality of the icons. The navigation system may further load the data array in a memory, such as a graphic memory of the navigation system and display the icon of the plurality of icons on a display device.

The plurality of the icons may be stored in the data array in form of a table containing information of the width, height, and coordinates of the icons in the image. The icon that is displayed on the display device may be retrieved from the table by referring to the coordinates of the icon in the table.

The positioning of the icon displayed in the digital map may overlap a map element of the digital map. The map element may be a graphical element of the digital map representing some physical object or cartographic feature. To avoid such overlap, the navigation system may determine a portion in the vicinity of the map element in the digital map where no overlap with the icon shall occur. The navigation system may position the icon in the digital map such that the portion in the vicinity of the map element in the digital map where no overlap with the icon shall occur is not covered by the icon.

Figure 2:
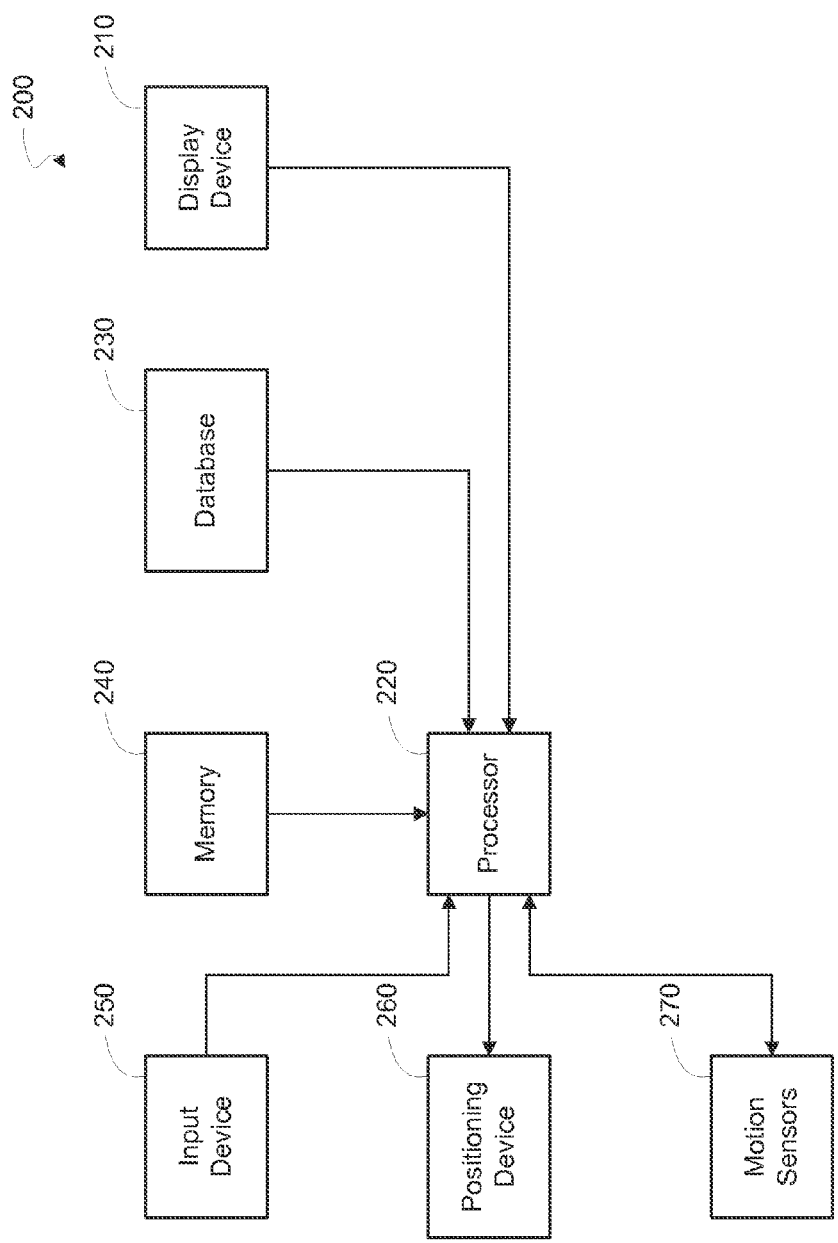
FIG. 2 illustrates a block diagram of an example of a navigation system for use in a vehicle.

An example navigation system 200, as shown in FIG. 2, may include a display device 210, a processor 220, a database 230, a memory 240, an input device 250, a positioning device 260, and motion sensors 270. The database 230 may be one or more navigation databases, storing the digital map data and data for the plurality of the icons in a data array, such as in one single data array representing an image containing the plurality of the icons. The processor 220, or central processing unit, may load the single data array in the memory 240. The display device 210 may display the digital map based on the digital map data and the icon of the plurality of icons on the digital map.

The processor 220 may be a microprocessor, a digital signal processor, a graphics processing unit, or any other processing unit capable of executing computer readable instructions. The processor 220 may be, for example, an x86 based processor or an ARM based processor or may employ any other processor architecture. The processor 220 may be a single core or a multi-core processor. The processor 220 may be a serial processor or a parallel processor.

The memory 240 may be volatile memory and/or non-volatile memory or a cache memory such as a random access memory (RAM), or flash memory. Alternatively or in addition, the memory 240 may include an optical, magnetic (hard-drive) or any other form of data storage device.

The digital map may be a two-dimensional or three-dimensional digital map. The digital map may have three-dimensional junction views.

A destination may be input in the navigation system by a user via the input device 250. The navigation system may determine a current position of the vehicle using the positioning device 260. The navigation system, with the processor 220 may further calculate a route to the destination. The navigation system 200 may be a vehicle navigation system, such as a GPS (Global Positioning System) equipped with motion sensors 270 such as ABS, and/or wheel sensors for localization of the vehicle and map matching. The navigation system 200 may determine the icons to be displayed on the display device 210 as part of the route before and during the travel to the destination.

The icons to be displayed may be symbols, for example, providing information about a traffic situation, points of interest (such as hotels, police offices, gas stations), route guidance, traffic signs, and other navigation related information. The icons may also be part of signposts that, as described earlier, can be relatively big signs displaying inter alia the direction to a city, signpost icons in form of a graphic representation of facilities as an industrial area, a soccer stadium, an airport, etc., road number icons indicating the number of a road, a highway, etc., an exit number icon indicating the road number of a road branching at an intersection (junction).

Based on the determined icons for displaying on the route, a data array representing an image containing the determined icons may be retrieved from the database 230. The retrieved data array may be loaded into the memory 240. The memory 240 may be part of the processor 220 or external to the processor 220. The memory 240 may be, for example, a graphic memory or a video memory. The retrieved data array may contain all or at least some of the icons to be displayed in the digital map shown to the user during the travel to the destination. Therefore, the icons may not be read out separately as they are needed for the display in the digital map. Once loaded into the memory 240 each icon of the data array can quickly be retrieved from the memory 240 for display in a digital map.

During route guidance a map section showing a part of the route to the destination input by the user may be shown on the display device 210. When the navigation system determines that one or more icons should be displayed in the map section, the respective icons may be retrieved from the data array in the memory 240 and displayed in the map section.

The data array may be an image data file, such as, a portable network graphics (PNG) file, a tagged image file format (TIFF) file, a graphics interchange format (GIF) file, a joint photographic experts group (JPEG) format file or any other formatted file. The icons may be arranged in the image file in the form of a table containing information on the widths, heights, and coordinates (x- and y-coordinate values) of the icons in the image. Alternately or in addition, the icons may be arranged in another data structure, such as a tree or a cyclic graph that allows for the individual retrieval of data entries (in form of the icons).

The navigation system may use different image files in different formats for multiple data arrays. An image file format, such as the PNG, may be used to store the data array in an intermediate stage of editing. The image file format used may be fully lossless. The navigation system may also use an image file format such as a format that supports up to 48-bit true color or 16-bit grayscale, which may, for example allow—saving, restoring and re-saving an image without substantial degradation of quality, unlike, for example, the JPEG format. The image file format used may be a raster format that represents the image as a two-dimensional array of colored dots or pixels. The image file format may further be configured to store images in true color, grayscale or palette-based format.

The navigation system may further perform integrity-checking. The integrity-checking may involve adding an 8-byte signature at the beginning of every image. Alternately, the integrity-checking may perform a 32-bit cyclic redundancy check. In another example the integrity-checking may only be performed on chunks of the image.

The icons in the image file, such as a PNG image file, representing the data array may be two-dimensional or three-dimensional icons. For example, the icons may be vector graphics. Based on recorded images of buildings, or the like, three-dimensional models may be synthesized as vector graphics. The synthesized models may be stored using data formats and algorithms adapted to the computer resources of the vehicle navigation system. Since vector graphics are based on mathematical functions, they may be calculated from relatively few data points that have to be stored. Data of each vector graphic may be stored in a vector database and the vector graphic may be calculated at runtime using substantial computational resources.

The navigation system may further determine a position of the displayed icon in the digital map. The navigation system may determine the portion of a map element where an icon shall be displayed where no overlap with the icon shall occur or to determine a portion in the vicinity of the map element in the digital map where no overlap with the icon shall occur. The navigation system may, for example, position the icon in the digital map such that the portion of the map element where no overlap with the icon shall occur and/or the portion in the vicinity of the map element in the digital map where no overlap with the icon shall occur is not substantially covered by the icon.

A map element may be a graphical element of the map representing some physical object or cartographical feature, for example, a building, a road, a mountain, a river, or a lake. By determining the portion of the map element where no over-lap with the icon shall occur and/or the portion in the vicinity of the map element in the digital map where no overlap with the icon shall occur, the icon may not partly overlap and hide the portion of the map element. Thus, for example, a junction in two-dimensional or three-dimensional view may be displayed in a manner that all relevant parts may be completely seen in the display by the user.

The portion of the map element where no overlap with the icon shall occur and/or the portion in the vicinity of the map element in the digital map where no overlap with the icon shall occur may be determined based on coordinates provided for the digital map. This may further enable positioning of the icon. Further, coordinate values of a point of the map element may be determined. The portion of the map element where no overlap with the icon shall occur and/or the portion in the vicinity of the map element in the digital map where no overlap with the icon shall occur may be determined based on the point and the corresponding determined coordinate values. The coordinate values of the point used to determine the portion may be stored in the database of the navigation system.

In an example navigation system, the portion of the map element in the digital map where no overlap with the icon shall occur and/or the portion in the vicinity of the map element where no overlap with the icon shall occur may be determined using a predetermined radius about the determined coordinate values of the point. For example, the portion may be a portion within the predetermined radius about coordinates of a central point of the map element. Information on the coordinate values of the point may also be stored in the database of the navigation system.

The digital map may, for example, include entire street networks in a substantially two-dimensional representation. The digital map may contain height information of streets. The height information may be information on relative height of a particular street with respect to crossing street vectors. The height information may enable representation of the street network in the appropriate order with respect to the spatial depth. Alternatively, the digital map may be generated based on a three-dimensional terrain model such as a digital model of terrain obtained by laser-scanning, referred to as a digital terrain model.

The digital terrain model may be provided by official institutions and/or commercial providers. The digital terrain model may be a digital file consisting of terrain elevations for ground positions at regularly or irregularly spaced horizontal intervals. The digital terrain model may be used in generation of the three-dimensional digital map displaying terrain slope, the direction of slope and terrain profiles between selected points.

The navigation system may display detailed three-dimensional junction views. For example, video data may be obtained from a junction and stored to an offline-database. The offline-database may include a main image file containing images, such as bitmap images, for all cartographic features such as lanes, sign post information, and landmarks. The navigation system may model the junction view based on the offline-database by analyzing the images in the offline-database. The images in the offline-database may consist of images of the road geometry, for example, three lanes with an exit for one of these lanes. The offline-database images may also convey a recommended lane, signposts, landmarks, skyline and color of the sky and other such visual information. Elements of the three-dimensional junction views may be stored in one single data array representing the image containing the plurality of icons as described elsewhere.

The navigation system may further display detailed three-dimensional animated junction views. In this case, when a vehicle equipped with the navigation system approaches the junction, a representation of the respective junction may be provided by a junction view database. The junction view database may contain references to an animation database storing animated data. The animated data may consist of data units that may further consist of bitmaps and/or vector graphics and/or metafiles, or a combination of bitmaps, vector graphics and other visual information.

The animation data may consist of a temporal sequence of individual static images. The speed at which the animation takes place may depend on a location and speed of the vehicle. The animation data may show perspective views of the approached junction, including number of lanes, slopes, branches and crossroads, and other such visual information.

Moreover, the animation data may include topographical objects such as bridges and administrative buildings, and also signposts and environmental views representing an urban, rural or industrial environment or a mountain landscape.

A junction view calculation unit of the navigation system may communicate with the animation database to obtain the relevant animated junction view data. Alternatively, the junction view calculation unit may produce animated data from images provided by the animation database and/or the junction view database and/or the navigation database.

The animated data may be available in a format such as the Audio Video Interleave Format (AVI). In this case, the AVI data may be provided to an AVI player of the navigation system. The animation may start and end at predefined positions ahead and behind of the junction. The AVI player may be synchronized with data provided by the positioning system which determines the position of the vehicle. The elapsed time may be synchronized with the driven distance, so that a synthesized animated junction view is displayed on the display device of the navigation system synchronously to the position of the vehicle. The icons may represent elements of the animated junction view.

For example, the digital map may be used in navigation systems for pedestrians or a vehicle navigation system, for example, a navigation system installed in an aircraft, boat or automobile.

The data array or the image containing the icons may be modified after the navigation system has been purchased by the user. For example, the image with the icons may be enlarged by additional icons. The user may download new icons, for instance, representing special points of interest, via the Internet or may buy a computer-readable medium, such as a DVD, containing new icons and load the new icons into the navigation system. If the new icons are of a suitable format they may be incorporated into the data array or image. If the icons are ordered in the image into a format such as a table, new entries of the table may be generated for accommodating the new icons.

Multiple data arrays each representing an image containing a plurality of icons may be generated for the navigation system. Each of the data arrays may include icons that are to be displayed under particular circumstances or context. For example, one of the data arrays may contain icons that may be displayed in an off-road mode of the navigation system.

The user of the navigation system may select the off-road mode and, in response to this selection, the particular data array that contains the respective icons suitable to be displayed in the off-road mode is loaded into the memory. Other icons contained in other data arrays may not be considered. Thus, the icons suitable for the off-road mode may be made available for display. Since the entire image containing the icons of the off-road mode may be loaded in the memory, the icons may be displayed without temporal delay.

For example, in the off-road mode, the display may not indicate map elements such as traffic jams or traffic lights and, thus, the image containing the icons of the off-road mode may not contain icons indicating such map elements. Thus, the navigation system may not load into the memory the icons that may not be shown during route guidance in the digital map.

The image containing icons suitable for navigation in a city area may be loaded into the memory when navigation in the city area is requested by a user of the navigation system. The image may contain icons showing map elements such as traffic lights and traffic jams, which were not part of the image in the off-road mode. Thus, classification of the icons into different kinds of data arrays may further facilitate the management of the icons to be displayed during route guidance.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for managing icons in a navigation database comprising:
    storing, with a processor, a different image into each data array included in a plurality of data arrays residing within a navigation database, wherein each image includes a different version of a plurality of icons, and each data array included in the plurality of data arrays is associated with a different context of a navigation system;
    based on a current context of the navigation system, transferring a first data array included in the plurality of data arrays from the navigation database into a memory, wherein the first data array includes a first image associated with the current context of the navigation system;
    retrieving, by the processor, an icon included in the first image from the memory, the icon corresponding to a map element on a navigation route; and
    displaying, on a display device, the retrieved icon and the navigation route within a map.

2. The method of claim 1, wherein the first data array comprises a table including data for the plurality of icons, wherein the data includes width, height, and coordinates of each icon of the subset of icons in the image.

3. The method of claim 1, wherein retrieving the icon from the data array is based on coordinates of the icon in the image.

4. The method of claim 1, further comprising:
    identifying, by the processor, the version of the plurality of icons corresponding to the current context of the navigation system.

5. The method of claim 4, wherein the current context of the navigation system is a mode of operation of the navigation system.

6. The method of claim 4, wherein the current context of the navigation system is a time of day the navigation system is being used.

7. The method of claim 4, further comprising:
    identifying, by the processor, a second context of the navigation system; and
    based on the second context of the navigation system, transferring, by the processor, a second data array included in the plurality of data arrays into the memory.

8. The method of claim 4, wherein the current context of the navigation system is based on whether the navigation system is being used in an off-road navigation node or an on-road navigation mode.

9. A vehicle navigation system, comprising
    a database configured to store a different image into each data array included in a plurality of data arrays residing within a navigation database, wherein each image includes a different version of a plurality of icons, and each data array included in the plurality of data arrays is associated with a different context of a navigation system;

a processor configured to;
   based on a current context of the navigation system, transfer a first data array included in the plurality of data arrays from the navigation database into a memory, wherein the first data array includes a first image associated with the current context of the navigation system,
   identify a cartographic feature within a map,
   retrieve, from the memory, an icon included in the first image corresponding to the cartographic feature, and identify a position in the map to display the icon; and
a display device configured to display the map, and the icon in the map at the determined position.

10. The vehicle navigation system of claim 9, wherein retrieval of the icon from the data array is based on coordinates of the icon in the first image.

11. The vehicle navigation system of claim 9, wherein:
the database is configured to store data for a second version of the plurality of icons in a second data array representing a second image composed of the second version of the plurality of icons; and
the processor is further configured to retrieve the icon from the second data array based on a second context of the vehicle navigation system.

12. The vehicle navigation system of claim 11, wherein the current data array is loaded into a memory with a retrieval speed faster than a retrieval speed associated with the database.

13. The vehicle navigation system of claim 12, wherein the processor is further configured to store a reference between the icon and the background of the signpost.

14. The vehicle navigation system of claim 9, wherein the icon is displayed as part of a signpost, and wherein the signpost includes the icon and a background stored separately from the data array.

15. The vehicle navigation system of claim 9, wherein the data array comprises a table including information on width, height, and coordinates of the icons in the image.

16. A non-transitory computer readable storage medium including instructions that, when executed by a processor, cause the processor to:
   store data for a subset of icons in a plurality of data arrays representing an image containing the subset of icons, wherein each data array included in the plurality of data arrays is associated with a different context of a navigation system;
   load a data array included in the plurality of data arrays into a memory based on a current context of the navigation system;
   identify a cartographic feature within a map;
   retrieve an icon included in a first image from the memory corresponding to the cartographic feature; and
   display the retrieved icon within the map.

17. The non-transitory computer readable storage medium of claim 16, further including instructions that, when executed by the processor, cause the processor to:
   compose a second image including a second version of the plurality of icons from the database;
   load one of the first image or the second image in a memory; and
   retrieve the icon from one of the first image or the second image in the memory.

18. The non-transitory computer readable storage medium of claim 17, wherein the first image corresponds to a first context of the navigation system and the second image corresponds to a second context of the navigation system, and the first image contains a first icon corresponding to the cartographic feature and the second image contains a second icon corresponding to the cartographic feature.

19. The non-transitory computer readable storage medium of claim 16, wherein the image includes information on width, height, and coordinates of the icons in the image.

20. The non-transitory computer readable storage medium of claim 16, further including instructions that, when executed by the processor, cause the processor to:
   determine a portion in the map in vicinity of the cartographic feature wherein no overlap with the icon shall occur; and
   position the icon for display such that the portion is not covered by the icon.

\* \* \* \* \*